(12) United States Patent
Dong

(10) Patent No.: US 11,138,099 B2
(45) Date of Patent: Oct. 5, 2021

(54) METHOD FOR TESTING SOFTWARE, AND COMPUTING DEVICE AND COMPUTER-READABLE STORAGE MEDIUM THEREOF

(71) Applicant: CLOUDMINDS (SHENZHEN) ROBOTICS SYSTEMS CO., LTD., Shenzhen (CN)

(72) Inventor: Kongming Dong, Shenzhen (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 0 days.

(21) Appl. No.: 16/728,325

(22) Filed: Dec. 27, 2019

(65) Prior Publication Data

US 2020/0379890 A1    Dec. 3, 2020

(30) Foreign Application Priority Data

Dec. 28, 2018  (CN) .......................... 201811627706.5

(51) Int. Cl.
  *G06F 9/44* (2018.01)
  *G06F 11/36* (2006.01)

(52) U.S. Cl.
  CPC ...... *G06F 11/3688* (2013.01); *G06F 11/3684* (2013.01)

(58) Field of Classification Search
  CPC .................... G06F 11/3688; G06F 11/3684
  See application file for complete search history.

(56) References Cited

U.S. PATENT DOCUMENTS

2019/0079853 A1*  3/2019  Makkar ................ G06F 8/71

* cited by examiner

*Primary Examiner* — Chuck O Kendall

(57) ABSTRACT

A method for testing software includes: determining influencing factors which influence implementation of a target function of the software; constructing a test case set for each of the influencing factors; inputting the test case set corresponding to each of the influencing factors to the software; enabling the software to run the test case set; calculating an accuracy of each of the influencing factors against implementation of the target function of the software according to a running result of the test case set run by the software; determining, according to the accuracy achieved each of the influencing factors, whether a predetermined qualification condition is satisfied; determining that the software is tested to be qualified if the predetermined qualification condition is satisfied; and determining that the software is tested to be unqualified if the predetermined qualification condition is not satisfied.

3 Claims, 3 Drawing Sheets

METHOD FOR TESTING SOFTWARE, AND COMPUTING DEVICE AND COMPUTER-READABLE STORAGE MEDIUM THEREOF

CROSS-REFERENCE TO RELATED APPLICATIONS

This application claims priority to Chinese Patent Application No. 201811627706.5, filed with the Chinese Patent Office on Dec. 28, 2018, titled "METHOD AND APPARATUS FOR TESTING SOFTWARE, AND COMPUTING DEVICE AND COMPUTER-READABLE STORAGE MEDIUM THEREOF", the entire contents of which are incorporated herein by reference.

TECHNICAL FIELD

Embodiments of the present application relate to the technical field of software testing, and in particular, relate to a method and apparatus for testing software, and a computing device and a computer-readable storage medium thereof.

BACKGROUND

Software testing is a process for promoting authentication of correctness, integrity, security and quality of the software. The software program is run and operated under prescribed conditions. In this way, errors of the program may be detected, and thus the quality of the software may be measured, and it may be evaluated whether the software satisfy design requirements. At present, a mainstream test method includes inputting test data into the software program to obtain a test result, and comparing the test result with a label to conclude a qualification rate.

During practice of the present application, the inventors have identified that: In the traditional test method, the test data is randomly selected, and if the test data is not complete, the qualification rate indicated in the test result is a relative value which may not reflect merits and demerits of the current software.

SUMMARY

An embodiment of the present application provides a method for testing software. The method includes: determining influencing factors which influence implementation of a target function of the software; constructing a test case set for each of the influencing factors; inputting the test case set corresponding to each of the influencing factors to the software; enabling the software to run the test case set; calculating an accuracy of each of the influencing factors against implementation of the target function of the software according to a running result of the test case set run by the software; determining, according to the accuracy achieved each of the influencing factors, whether a predetermined qualification condition is satisfied; determining that the software is tested to be qualified if the predetermined qualification condition is satisfied; and determining that the software is tested to be unqualified if the predetermined qualification condition is not satisfied.

Another embodiment of the present application provides a computing device. The computing device includes: a processor, a memory, a communication interface and a communication bus; wherein the processor, the memory and the communication bus communicate with each other via the communication bus; and the memory is configured to store at least one executable instruction, wherein the executable instruction causes the processor to perform the steps of: determining influencing factors which influence implementation of a target function of the software; constructing a test case set for each of the influencing factors; inputting the test case set corresponding to each of the influencing factors to the software; enabling the software to run the test case set; calculating an accuracy of each of the influencing factors against implementation of the target function of the software according to a running result of the test case set run by the software; determining, according to the accuracy achieved each of the influencing factors, whether a predetermined qualification condition is satisfied; determining that the software is tested to be qualified if the predetermined qualification condition is satisfied; and determining that the software is tested to be unqualified if the predetermined qualification condition is not satisfied.

Still another embodiment of the present application provides a computer-readable storage medium. The storage medium storing at least one executable instruction; wherein the executable instruction, when being executed, causes the processor to perform the steps oft determining influencing factors which influence implementation of a target function of the software; constructing a test case set for each of the influencing factors; inputting the test case set corresponding to each of the influencing factors to the software; enabling the software to run the test case set; calculating an accuracy of each of the influencing factors against implementation of the target function of the software according to a running result of the test case set run by the software; determining, according to the accuracy achieved each of the influencing actors, whether a predetermined qualification condition is satisfied; determining that the software is tested to be qualified if the predetermined qualification condition is satisfied; and determining that the software is tested to be unqualified if the predetermined qualification condition is not satisfied.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present application. In all the accompanying drawings, like reference signs denote like parts. In the drawings.

DETAILED DESCRIPTION

Some exemplary embodiments of the present application are hereinafter described in detail with reference to the accompanying drawings. Although the accompanying drawings illustrate the exemplary embodiments of the present application, it shall be understood that the present application may be practiced in various manners, and the present application shall not be limited by the embodiments illustrated herein. On the contrary, these embodiments are described herein only for the purpose of better understanding the present application, and may integrally convey the scope of the present application to a person skilled in the art.

Figure 1:
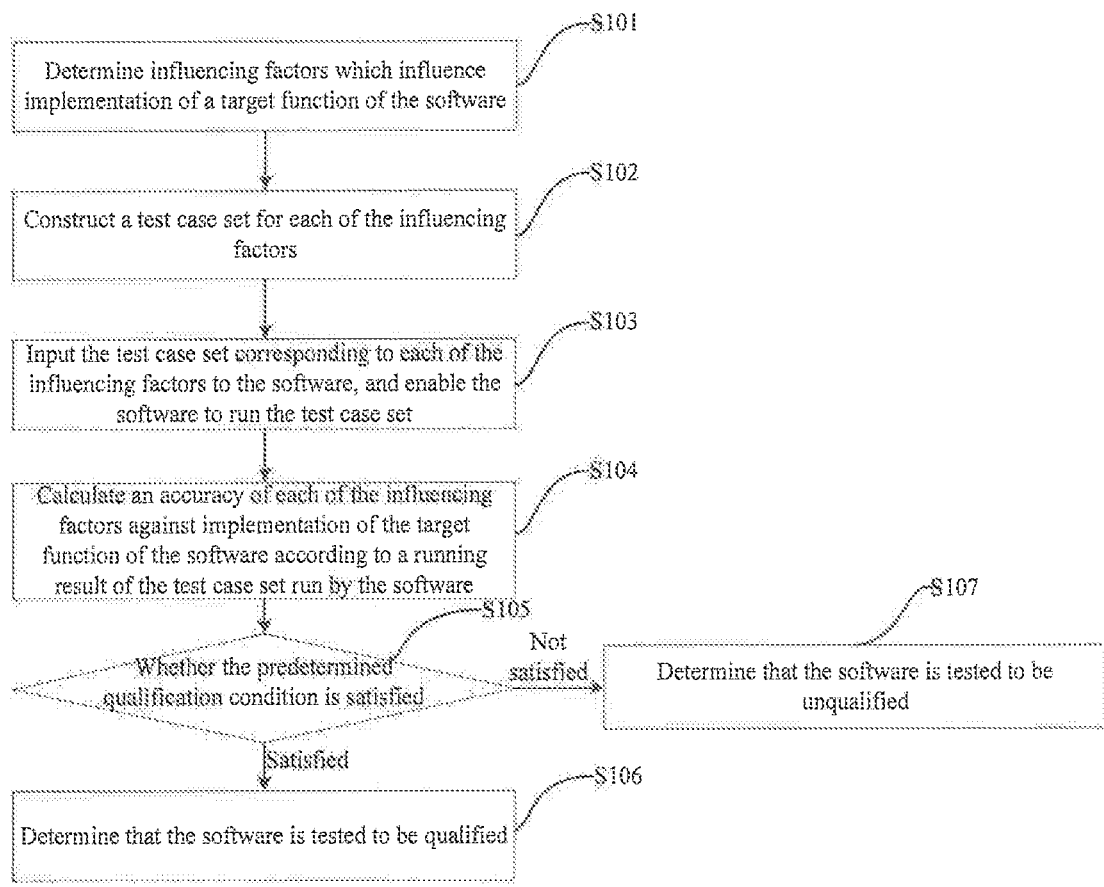
FIG. 1 is a flowchart of a method for testing software according to an embodiment of the present application.

FIG. 1 is a flowchart of a method for testing software according to an embodiment of the present application. As illustrated in FIG. 1, the method includes the following steps:

Step S101: Influencing factors which influence implementation of a target function of the software are determined.

In this step, the target function to be implemented by the software is the objective of design of the software. For example, if the software is object identification software, the target function to be implemented by the object identification software is to correctly identifying an object. The influencing factors refer to some factors which may influence implementation of the target function of the software. In some embodiments, influencing factors may be determined based on the target function of the software. Using the object identification software as an example, the target function is to correctly identify an object under test, and the influencing factors which influence correct identification of the object include: shape of the object, height of the object, color of the object and the like characteristics of the object.

Step S102: A test case is constructed for each of the influencing factors.

After the influencing factors are identified, a decision tree is constructed for each of the influencing factors. The decision trees for all the influencing factors constitute a decision tree group. During test of the software, all the decision trees in the decision tree group need to be traversed to thoroughly test the software. In addition, after the decision tree is constructed for each of the influencing factors, a factor associated with the influencing factor may be analyzed based on the decision tree, and then a test case may be constructed based on the decision tree. In this way, a more complete test case may be prepared for the influencing factor to more accurately test a qualification rate of the software.

Figure 2:
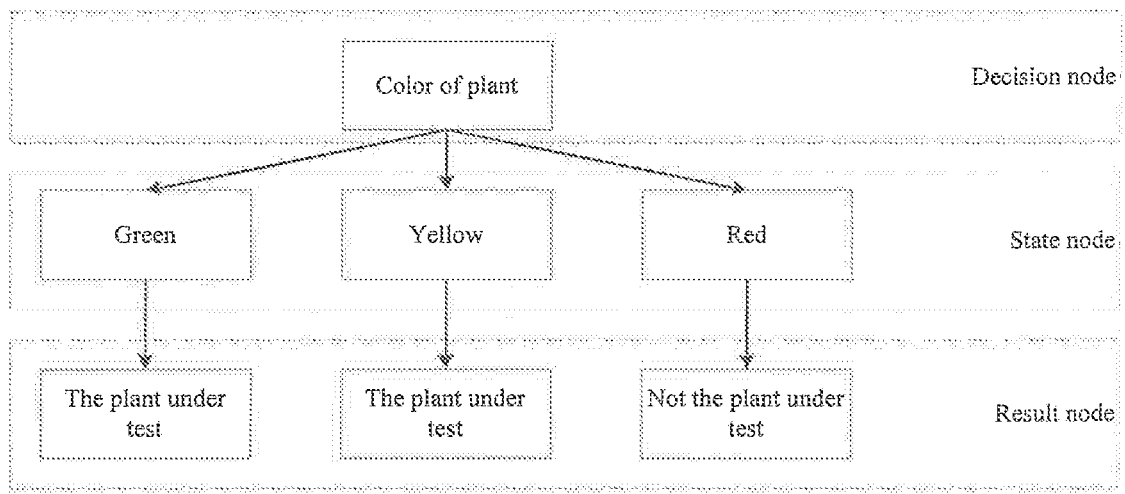
FIG. 2 is a schematic structural diagram of a plant color decision tree in a method for testing software according to an embodiment of the present application.

Using the object identification software as an example, it is assumed that the object to be identified is a particular plant, and characteristics of the plant include color of the plant, shape of the leaves, texture of the leaves, size of the plant, and shape of the flowers, then a decision tree is constructed for each of the characteristics. For example, the characteristic of the color of the plant is represented by green and yellow. It should be noted that, the plant exhibits different colors of leaves in different seasons. During construction of the decision tree based on the color of the plant, the color of the plant is taken as a decision node, different exhibition forms of the color of the plant are taken as state nodes, and comparison results against a label of the plant are taken as result nodes. FIG. 2 is a schematic structural diagram of a plant color decision tree. As illustrated in FIG. 2, the state nodes include green, yellow and red. A result is identified according to the state node. For example, if states of the state nodes are green and yellow, it is determined that the object is the plant to be identified. According to the states of the state nodes, several test case sets are selected respectively. For example, 10 test samples are respectively selected for the green plant, the yellow plant and the red plant. Likewise, with respect to other characteristics, decision trees are also constructed. For example, when the shape of the leaves of the plant to be tested is exhibited as a circular or elliptical shape, the object shall be the plant to be identified. In other plants, the shape of the leaves may be a triangle shape, and test samples are respectively selected with respect to the circular shape of the leaves, the elliptical shape of the leaves, and the triangular shape of leaves.

In one embodiment, with respect to the test samples in each of the characteristics, during selection of the samples, only the current characteristic is exhibited in different form, and the other characteristics are all exhibited in the same form. For example, in the currently selected 10 green plants and 10 yellow plants, except the color, the other characteristics, for example, the shape of the leaves, and the texture of the leaves are all the same. In this embodiment, a function point to be improved in the software under test may be precisely targeted.

In one embodiment, the exhibition forms of different characteristics are combined. For example, green in the color characteristic is respectively combined with circular shape, elliptical shape and triangular shape in the shape characteristic of the leaves to construct a new test case. In this embodiment, a function point to be improved in the software under test may be targeted with respect to different characteristics.

Step S103: The test case set corresponding to each of the influencing factors is input to the software, and the software is enabled to run the test case set.

The test case set includes several test cases. The several test cases in the same test case set may all be selected as different test cases to test various aspects of the influencing factor.

Step S104: An accuracy of each of the influencing factors against implementation of the target function of the software is calculated according to a running result of the test case set run by the software.

In some embodiments, the test cases in the test case set may be pre-marked with results. After the software runs the test cases, whether a running result of the software is correct may be judged directly according to the pre-marked results.

Figure 3:
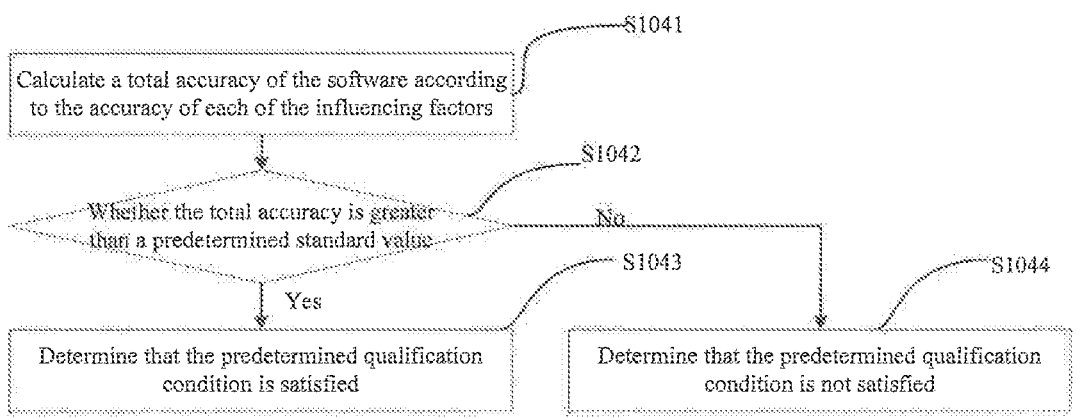
FIG. 3 is a flowchart of accuracy calculation in a method for testing software according to an embodiment of the present application.

In some embodiments, as illustrated in FIG. 3, the calculating the accuracy includes the following steps:

Step S1041: A total accuracy of the software is calculated according to the accuracy of each of the influencing factors.

In this step, the total accuracy of the software is calculated according to the accuracy of each of the influencing factors and in combination with a predetermined weight defined for each of the influencing factors by the following formula:

$$\text{Accuracy} = \sum_{i=1}^{n} \text{accuracy}(i) \cdot \text{weight}(i)$$

wherein Accuracy denotes the total accuracy of the software, accuracy(i) denotes an accuracy of an $i^{th}$ influencing factor, and weight(i) denotes a weight defined for an $i^{th}$ influencing factor, and n denotes the total number of influencing factors.

For example, in software for identifying plants, if three characteristics of a plant are selected, for example, color of the plant, shape of leaves and texture of leaves, then n=3, and 100 test samples are selected for each of the characteristics. When the characteristic of color is used as a distinguishing characteristic, 95 test samples are correctly identified; when the characteristic of shape of leaves is used as a distinguishing characteristic, 80 test samples are correctly identified; and when the characteristic of texture of leaves is used as a distinguishing characteristic, 10 test samples are currently identified. In this case, test accuracies of the three characteristics are respectively accuracy(1)=95% for the plant color, accuracy(2)=80% for the shape of leaves, and accuracy(3)=10% for the texture of leaves; and predetermined weights defined for the three characteristics are respectively weight(1)=40%, weight(1)=30% and weight(3)=30%. Then, a total identification rate is as follows:

Accuracy=accuracy(1)·weight(1)+accuracy(2)·weight(2)+accuracy(3)·weight(3)=95%·40%+80%·30%+10%·30%=65%. It is thus considered that the identification result indicates a 65% probability of the plant to be identified.

It should be noted that the predetermined weights are defined by the test solution makers, and then agreed by the research and development staff and the test staff upon sufficient discussions. Depending on different test objectives, the weights are also different.

Step S1042: Whether the total accuracy is greater than a predetermined standard value is judged. Step S1043 is performed if the total accuracy is greater than the predetermined standard value, and step S1044 is performed if the total accuracy is not greater than the predetermined standard value.

In this step, the predetermined standard value is defined collaboratively by solution makers, research and development staff and test staff, which are all software development related departments, and it's defined in combination with the software test standards.

Step S1043: It is determined that the predetermined qualification condition is satisfied.

Step S1044: It is determined that the predetermined qualification condition is not satisfied.

Step S105: Whether the predetermined qualification condition is satisfied is judged according to the accuracy of each of the influencing factors. Step S106 is performed if the predetermined qualification condition is satisfied, and step S107 is performed if the predetermined qualification condition is not satisfied.

In this step, the total accuracy is compared with the predetermined standard value; if the total accuracy is greater than or equal to the predetermined standard value, it is considered that the predetermined qualification condition is satisfied; and if the total accuracy is less than the predetermined standard value, it is considered that the predetermined qualification standard is not satisfied. For example, if the predetermined qualification standard is defined as 90%, in the previous step, the calculated total accuracy is 65%, it is considered that the predetermined qualification condition is not satisfied.

Step S106: It is determined that the software is tested to be qualified.

In this step, if the software under test is tested to be qualified, a test result is returned to the research and development department.

Step S107: It is determined that the software is tested to be unqualified.

In this step, if the software is tested to be unqualified, a test result is also returned to the research and development department, and an improvement point of the software against a particular influencing factor is indicated in combination with the test result of each of the influencing factors in the test case set.

This embodiment of the present application achieves the following beneficial effect: By analyzing the influencing factors of implementation of the target function of the software under test, a test case set is constructed for each of the influencing factors, such that the test case set may include various influencing factors of the designed function of the software, and thus the test result of the software is more reliable.

Figure 4:
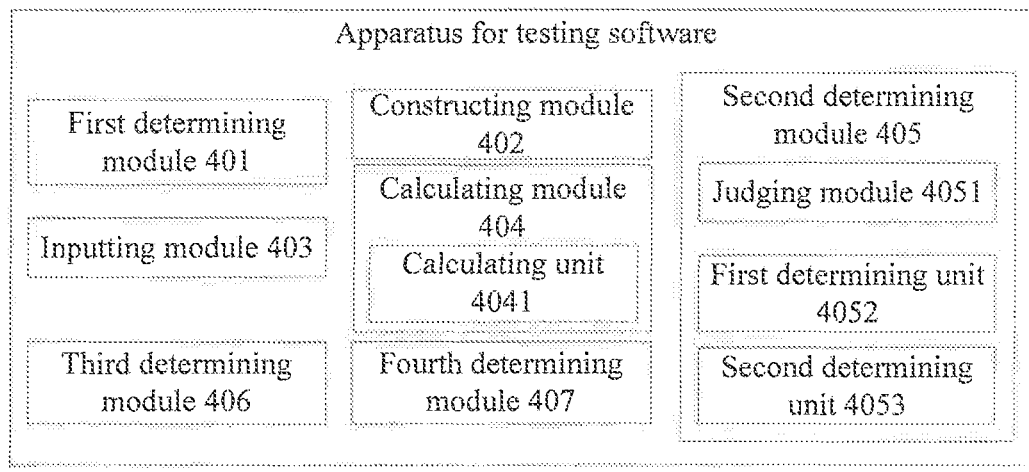
FIG. 4 is a functional block diagram of an apparatus for testing software according to an embodiment of the present application.

FIG. 4 is a functional block diagram of an apparatus for testing software. As illustrated in FIG. 4, the apparatus includes: a first determining module 401, a constructing module 402, an inputting module 403, a calculating module 404, a second determining module 405, a third determining module 406 and a fourth determining module 407. The first determining module 401 is configured to determine influencing factors which influence implementation of a target function of the software; the constructing module 402 is configured to construct a test case set for each of the influencing factors; the inputting module 403 is configured to input the test case set corresponding to each of the influencing factors to the software, and enable the software to run the test case set; the calculating module 404 is configured to calculate an accuracy of each of the influencing factors against implementation of the target function of the software according to a running result of the test case set run by the software; the second determining module 405 is configured to determine, according to the accuracy achieved each of the influencing factors, whether a predetermined qualification condition is satisfied; the third determining module 406 is configured to determine that the software is tested to be qualified if the predetermined qualification condition is satisfied; and the fourth determining module 407 is configured to determine that the software is tested to be unqualified if the predetermined qualification condition is not satisfied.

The calculating module 404 includes a calculating unit, configured to calculate a total accuracy of the software according to the accuracy of each of the influencing factors. The second determining module 405 includes a judging unit 4051, a first determining unit 4052 and a second determining unit 4053; wherein the judging unit 4051 is configured to judge whether the total accuracy is greater than a predetermined standard value; the first determining unit 4052 is configured to determine that the predetermined qualification condition is satisfied if the total accuracy is greater than the predetermined standard value; and the second determining unit 4053 is configured to determine that the predetermined qualification condition is not satisfied if the total accuracy is not greater than the predetermined standard value.

The calculating unit 4041 is configured to calculate the total accuracy of the software according to the accuracy of each of the influencing factors by the following formula:

$$\text{Accuracy} = \sum_{i=1}^{n} \text{accuracy}(i) \cdot \text{weight}(i)$$

wherein Accuracy denotes the total accuracy of the software, accuracy(i) denotes an accuracy of an $i^{th}$ influencing factor, and weight(i) denotes a weight defined for an $i^{th}$ influencing factor, and n denotes the total number of influencing factors.

This embodiment of the present application corresponds to the above embodiment. Therefore, the specific functions and implementations of the modules and units may be referenced to the above embodiment, which are thus not described herein any further.

This embodiment of the present application achieves the following beneficial effect: By determining the influencing factors of implementation of the target function of the software under test by the determining module, a test case set is constructed by the constructing module for each of the influencing factors, such that the test case set may include various influencing factors of the designed function of the software, and thus the test result of the software is more reliable.

An embodiment of the present application provides a non-volatile computer-readable storage medium, wherein the computer-readable storage medium stores at least one computer-executable instruction, which may be executed to perform the method for testing software in any of the above method embodiments.

Figure 5:
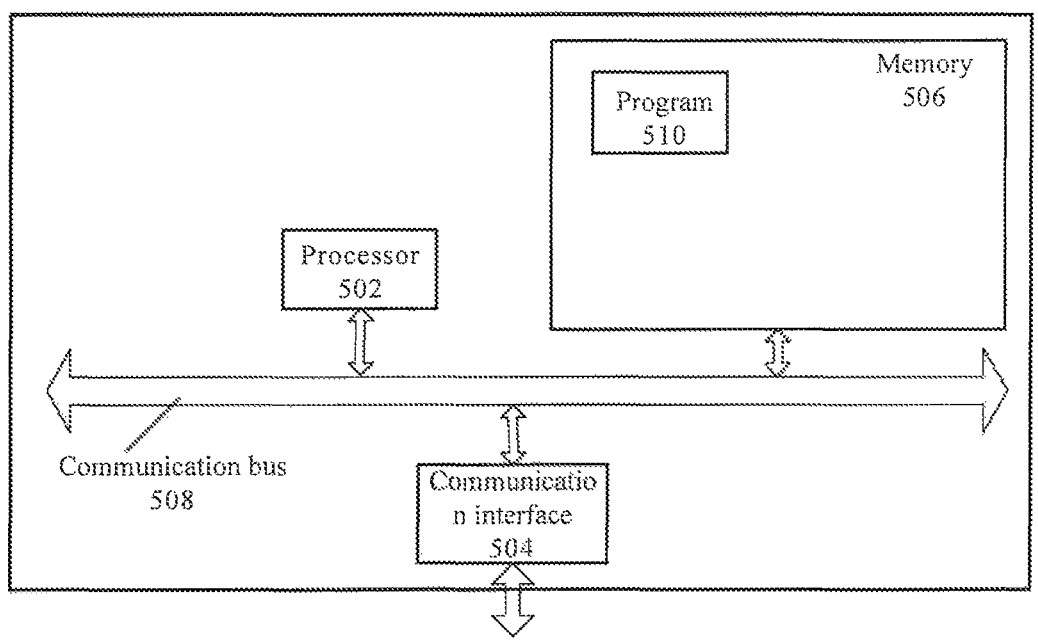
FIG. 5 is a schematic diagram of a computing device according to an embodiment of the present application.

FIG. 5 is a schematic structural diagram of a computing device according to an embodiment of the present application. The specific embodiments of the present application set no limitation to the practice of the computing device.

As illustrated in FIG. 5, the computing device may include: a processor 502, a communication interface 504, a memory 506 and a communication bus 508.

The processor 502, the communication interface 504 and the memory 506 communicate with each other via the communication bus 508.

The communication interface 504 is configured to communicate with a network element such as a client, a server or the like.

The processor 502 is configured to execute a program 510, and may specifically perform steps in the embodiments of the method for testing software.

Specifically, the program 510 may include a program code, wherein the program code includes a computer-executable instruction.

The processor 502 may be a central processing unit (CPU) or an Application Specific Integrated Circuit (ASIC), or configured as one or more integrated circuits for implementing the embodiments of the present invention. The computing device includes one or more processors, which may be the same type of processors, for example, one or more CPUs, or may be different types of processors, for example, one or more CPUs and one or more ASICs.

The memory 506 is configured to store the program 510. The memory 506 may include a high-speed RAM memory, or may also include a non-volatile memory, for example, at least one magnetic disk memory.

The program 510 may be specifically configured to cause the processor 502 to perform the following operations:
determining influencing factors which influence implementation of a target function of the software;
constructing a test case set for each of the influencing factors;
inputting the test case set corresponding to each of the influencing factors to the software, and enabling the software to run the test case set;
calculating an accuracy of each of the influencing factors against implementation of the target function of the software according to a running result of the test case set run by the software;
determining, according to the accuracy achieved each of the influencing factors, whether a predetermined qualification condition is satisfied;
determining that the software is tested to be qualified if the predetermined qualification condition is satisfied; and
determining that the software is tested to be unqualified if the predetermined qualification condition is not satisfied.

In an optional implementation, the program 510 may be specifically further configured to cause the processor to perform the following operations:

calculating a total accuracy of the software according to the accuracy of each of the influencing factors;
judging whether the total accuracy is greater than a predetermined standard value;
determining that the predetermined qualification condition is satisfied if the total accuracy is greater than the predetermined standard value; and
determining that the predetermined qualification condition is not satisfied if the total accuracy is not greater than the predetermined standard value.

In an optional implementation, the program 510 may be specifically further configured to cause the processor 502 to perform the following operation: calculating the total accuracy of the software according to the accuracy of each of the influencing factors and in combination with a predetermined weight defined for each of the influencing factors.

In an optional implementation, the program 510 may be specifically further configured to cause the processor 502 to perform the operation of calculating the total accuracy of the software by the following formula:

$$\text{Accuracy} = \sum_{i=1}^{n} \text{accuracy}(i) \cdot \text{weight}(i)$$

wherein Accuracy denotes the total accuracy of the software, accuracy(i) denotes an accuracy of an $i^{th}$ influencing factor, and weight(i) denotes a weight defined for an $i^{th}$ influencing factor, and n denotes the total number of influencing factors.

The algorithms and displays provided herein are not inherently related to any specific computer, virtual system or other device. Various general-purpose systems may also be used with the teachings herein. According to the above description, the structure required for constructing such systems is obvious. In addition, the present application is not directed to any specific programming language. It should be understood that the content of the present application described herein may be carried out utilizing various programming languages, and that the above description for a specific language is for the sake of disclosing preferred embodiments of the present application.

In the specification provided herein, a plenty of particular details are described. However, it may be understood that an embodiment of the present application may also be practiced without these particular details. In some embodiments, well known methods, structures and technologies are not illustrated in detail so as not to obscure the understanding of the specification.

Likewise, it shall be understood that, to streamline the present application and facilitate understanding of one or more of various aspects of the present application, in the above description of the exemplary embodiments of the present application, various features of the present application are sometimes incorporated in an individual embodiment, drawing or description thereof. However, the method according to the present application shall not be explained to embody the following intention: the present application for which protection is sought claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present application.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present application and different embodiments may be derived. For example, in the claims appended hereinafter, any one of the embodiments for which protection is sought may be practiced in any combination manner.

Embodiments of the individual components of the present application may be implemented in hardware, or in a software module running one or more processors, or in a combination thereof. It will be appreciated by those skilled in the art that, in practice, some or all of the functions of some or all of the components in the apparatus for testing software according to individual embodiments of the present application may be implemented using a microprocessor or a digital signal processor (DSP). The present application may also be implemented as an apparatus of a device program (e.g., a computer program and a computer program product) for performing a part or all of the method as described herein. Such a program implementing the present application may be stored on a computer readable medium, or may be stored in the form of one or more signals. Such a signal may be obtained by downloading it from an Internet website, or provided on a carrier signal, or provided in any other form.

It should be noted that the above embodiments illustrate rather than limit the present application, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The word "a" or "an" used before an element does not exclude the presence of a plurality of such elements. The present application may be implemented by means of a hardware including several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A method for testing software, comprising:
determining influencing factors which influence implementation of a target function of the software;
constructing a test case set for each of the influencing factors;
inputting the test case set corresponding to each of the influencing factors to the software;
enabling the software to run the test case set;
calculating an accuracy of each of the influencing factors against implementation of the target function of the software according to a running result of the test case set run by the software;
determining, according to the accuracy achieved each of the influencing factors, whether a predetermined qualification condition is satisfied;
determining that the software is tested to be qualified if the predetermined qualification condition is satisfied; and
determining that the software is tested to be unqualified if the predetermined qualification condition is not satisfied;
wherein the calculating the accuracy of each of the influencing factors against implementation of the target function of the software and determining, according to the accuracy of each of the influencing factors, whether the predetermined qualification condition is satisfied comprises:
calculating a total accuracy of the software according to the accuracy of each of the influencing factors;
judging whether the total accuracy is greater than a predetermined standard value;
determining that the predetermined qualification condition is satisfied if the total accuracy is greater than the predetermined standard value; and
determining that the predetermined qualification condition is not satisfied if the total accuracy is not greater than the predetermined standard value;
wherein the calculating a total accuracy of the software according to the accuracy of each of the influencing factors comprises:
calculating the total accuracy of the software according to the accuracy of each of the influencing factors and in combination with a predetermined weight defined for each of the influencing factors;
wherein calculating the total accuracy of the software according to the accuracy of each of the influencing factors and in combination with a predetermined weight defined for each of the influencing factors comprises using the formula:

$$\text{Accuracy} = \sum_{i=1}^{n} \text{accuracy}(i) \cdot \text{weight}(i)$$

wherein Accuracy denotes the total accuracy of the software, accuracy(i) denotes the accuracy of an $i^{th}$ influencing factor, and weight(i) denotes the weight defined for an $i^{th}$ influencing factor, and n denotes the total number of influencing factors, denotes the multiplication operator.

2. A computing device, comprising: a processor, a memory, a communication interface and a communication bus; wherein the processor, the memory and the communication bus communicate with each other via the communication bus; and the memory is configured to store at least one executable instruction, wherein the executable instruction causes the processor to perform the steps of:

constructing a test case set for each of the influencing factors;

inputting the test case set corresponding to each of the influencing factors to the software;

enabling the software to run the test case set;

calculating an accuracy of each of the influencing factors against implementation of the target function of the software according to a running result of the test case set run by the software;

determining, according to the accuracy achieved each of the influencing factors, whether a predetermined qualification condition is satisfied;

determining that the software is tested to be qualified if the predetermined qualification condition is satisfied; and determining that the software is tested to be unqualified if the predetermined qualification condition is not satisfied;

wherein the calculating the accuracy of each of the influencing factors against implementation of the target function of the software and determining, according to the accuracy of each of the influencing factors, whether the predetermined qualification condition is satisfied comprises:

calculating a total accuracy of the software according to the accuracy of each of the influencing factors;

judging whether the total accuracy is greater than a predetermined standard value;

determining that the predetermined qualification condition is satisfied if the total accuracy is greater than the predetermined standard value; and determining that the predetermined qualification condition is not satisfied if the total accuracy is not greater than the predetermined standard value;

wherein the calculating a total accuracy of the software according to the accuracy of each of the influencing factors comprises:

calculating the total accuracy of the software according to the accuracy of each of the influencing factors and in combination with a predetermined weight defined for each of the influencing factors;

wherein calculating the total accuracy of the software according to the accuracy of each of the influencing factors and in combination with a predetermined weight defined for each of the influencing factors comprises using the formula:

$$\text{Accuracy} = \sum_{i=1}^{n} \text{accuracy}(i) \cdot \text{weight}(i)$$

wherein Accuracy denotes the total accuracy of the software, accuracy(i) denotes the accuracy of an $i^{th}$ influencing factor, and weight(i) denotes the weight defined for an $i^{th}$ influencing factor, and n denotes the total number of influencing factors, denotes the multiplication operator.

3. A computer-readable storage medium, the storage medium storing at least one executable instruction; wherein the executable instruction, when being executed, causes the processor to perform the steps of:

determining influencing factors which influence implementation of a target function of the software;

constructing a test case set for each of the influencing factors;

inputting the test case set corresponding to each of the influencing factors to the software;

enabling the software to run the test case set;

calculating an accuracy of each of the influencing factors against implementation of the target function of the software according to a running result of the test case set run by the software;

determining, according to the accuracy achieved each of the influencing factors, whether a predetermined qualification condition is satisfied;

determining that the software is tested to be qualified if the predetermined qualification condition is satisfied; and determining that the software is tested to be unqualified if the predetermined qualification condition is not satisfied;

wherein the calculating the accuracy of each of the influencing factors against implementation of the target function of the software and determining, according to the accuracy of each of the influencing factors, whether the predetermined qualification condition is satisfied comprises:

calculating a total accuracy of the software according to the accuracy of each of the influencing factors;

judging whether the total accuracy is greater than a predetermined standard value;

determining that the predetermined qualification condition is satisfied if the total accuracy is greater than the predetermined standard value; and determining that the predetermined qualification condition is not satisfied if the total accuracy is not greater than the predetermined standard value;

wherein the calculating a total accuracy of the software according to the accuracy of each of the influencing factors comprises:

calculating the total accuracy of the software according to the accuracy of each of the influencing factors and in combination with a predetermined weight defined for each of the influencing factors;

wherein calculating the total accuracy of the software according to the accuracy of each of the influencing factors and in combination with a predetermined weight defined for each of the influencing factors comprises using the formula:

$$\text{Accuracy} = \sum_{i=1}^{n} \text{accuracy}(i) \cdot \text{weight}(i)$$

wherein Accuracy denotes the total accuracy of the software, accuracy(i) denotes the accuracy of an $i^{th}$ influencing factor, and weight(i) denotes the weight defined for an $i^{th}$ influencing factor, and n denotes the total number of influencing factors, denotes the multiplication operator.

* * * * *